United States Patent [19]
Folds

[11] 3,866,711
[45] Feb. 18, 1975

[54] SOLID ULTRASONIC LENS DOUBLET

[75] Inventor: Donald L. Folds, Panama City, Fla.

[73] Assignee: The United States of America as represented by the Secretary of the Navy, Washington, D.C.

[22] Filed: June 4, 1973

[21] Appl. No.: 366,398

[52] U.S. Cl. ............................ 181/176, 340/8 L
[51] Int. Cl. ..................... G01s 3/80, H04r 23/00
[58] Field of Search ............ 181/.5 R, 176; 340/8 L; 350/175, 178

[56] References Cited
UNITED STATES PATENTS

| | | | |
|---|---|---|---|
| 2,346,002 | 4/1944 | Bennett | 350/175 NG |
| 2,972,068 | 2/1961 | Howry | 340/8 L |
| 3,248,460 | 4/1966 | Naujokas | 350/175 NG |
| 3,618,696 | 11/1971 | Hurwitz | 340/8 L |

Primary Examiner—Maynard R. Wilbur
Assistant Examiner—H. A. Birmiel
Attorney, Agent, or Firm—Richard S. Sciascia; Don D. Doty; Harvey A. David

[57] ABSTRACT

An acoustic lens for underwater use at ultrasonic frequencies is described that is corrected for thermal variations, spherical aberrations, and coma. The lens is characterized by a rigid, solid plastic first lens element to which is bonded a soft, resilient, solid plastic second lens element, the first element having its greater energy losses concentrated toward the periphery thereof to produce desirable shading effects. Specific examples of prescription fulfillment are provided.

9 Claims, 6 Drawing Figures

SOLID ULTRASONIC LENS DOUBLET

STATEMENT OF GOVERNMENT INTEREST

The invention described herein may be manufactured and used by or for the Government of the United States of America for Governmental purposes without the payment of any royalties thereon or therefor.

FIELD OF THE INVENTION

This invention relates to acoustic lenses and more particularly to improvements in such lenses for use in underwater environments with relatively high, ultrasonic frequencies.

Ultrasonic lenses have, for some time, found application in various experimental and practical schemes where mere concentration of energy has been required. More recently, particularly with respect to interest in developing high resolution sonars, there exists a need for improvements in the image forming capabilities of acoustic lenses. Heretofore, acoustic lenses for underwater use have principally comprised a body of liquid, held in the desired shape by a thin shell or rigid membrane. The liquid is chosen to have properties of refraction and transmission which render it useful, when confined in the shape of a lens by the shell or membrane, as a sonic energy focusing element. It has also been suggested that acoustic lenses for use in a liquid medium might be formed of a rigid solid material.

Considerable obstacles have been experienced in attempts to bring liquid filled lenses or solid lenses into use for acoustic purposes in underwater environments as part of sonar or other acoustic energy employing systems, particularly when the acoustic energy is in the range of ultrasonics. Inasmuch as high resolution sonars, underwater acoustic-to-optical image forming devices, and the like are, for other reasons, desirably operated in frequency ranges running from 100 KHz past 3 MHz, overcoming these obstacles are of notable importance.

One such obstacle resides in the fact that, however thin the liquid confining shell may be of a liquid filled lens, at the mentioned frequencies energy losses, reflections, and wavefront distortions by the shell are intolerable to the system. Moreover, the presence of the shell to liquid interfaces introduces at least two such interfaces more than are desired for each liquid filled lens in the system. Each such interface introduces additional losses and distortion. Another obstacle, and one that has to some degree been overcome as will be mentioned in the discussion below, is that temperature variations in the intended typical sea water environment of use of such lenses cause changes in the index of refraction of the lens material, thereby rendering the lens ineffective for its designed purpose. Other obstacles to development of suitable, high resolution acoustic lenses for underwater use include the need for reduction of spherical aberration and coma to an acceptable degree.

DISCUSSION OF THE PRIOR ART

U.S. Pat. No. 3,618,696 has attacked the problem of thermal dispersion, i.e., change of index of refraction with change in temperature, and teaches that temperature compensation can be effected in combinations of two spaced, separate lenses of different materials by selecting materials having different thermal dispersion factors. That patent, however, is silent as to specific materials other than aluminum as a shell for a liquid filled lens. In general, it has been considered that since liquids per se generally have lower absorption losses and better impedance match with water than do solids, that the use of liquid filled lenses is mandated. As mentioned above, such constructions are subject to high energy losses and distortion at higher frequencies where the lenses would be most used. The use of separate lenses having any space between adjacent surfaces, however small, introduces a region of high energy loss, especially at ultrasonic frequencies in the ranges of 100 KHz to beyond 3 MHz. Additionally, liquid filled lenses for use in sea water environments require means to accommodate changes in volume due to high coefficients of expansion of liquids.

SUMMARY OF THE INVENTION

Most or all of the aforementioned shortcomings, limitations and obstacles are overcome by the present invention through the judicious selection of solid materials, including hard or rigid materials and resilient or soft materials, and combinations of lenses therefrom into a bonded, two element lens structure.

With the foregoing in mind it is a principal object of the invention to provide an improved acoustic lens for use in a water medium.

Another object of the invention is to provide an improved acoustic lens structure having corrections for temperature variations, and is corrected for spherical aberration as well as coma.

Still another object of the invention is the provision of a lens of the foregoing character comprising two solid lens elements, one element formed of a relatively rigid material having a first thermal dispersion factor, and a second lens element having a second thermal dispersion factor and formed of a resiliently flexible material bonded to the first element.

As another object the invention aims to improve the resolution available from the two element lens structure through advantageous selection of materials and shapes that effect shading of energy losses toward the off axis portions of the structure.

Yet another object is the provision of an improved acoustic lens structure that is well adapted to use in underwater environments of varying temperature and depth extremes.

Still another object is to provide a novel method of manufacture of an ultrasonic, solid acoustic lens.

Other objects and many of the attendant advantages will be readily appreciated as the subject invention becomes better understood by reference to the following detailed description, when considered in conjunction with the accompanying drawings.

DESCRIPTION OF THE PREFERRED EMBODIMENT

Figure 1:
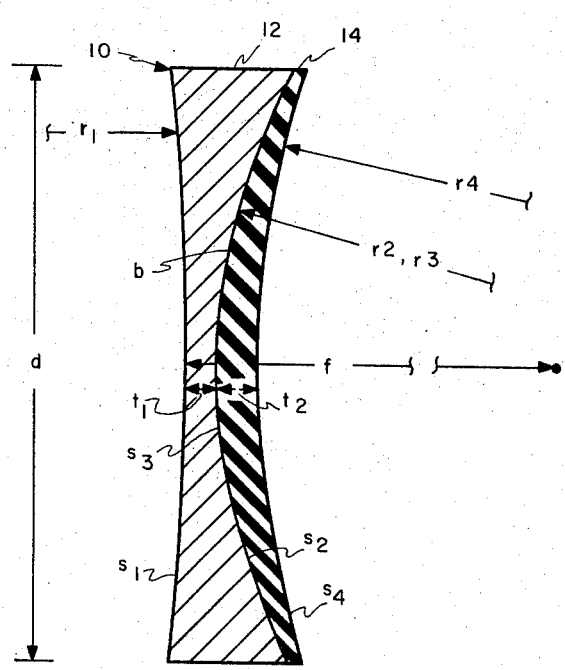
FIG. 1 is a diagrammatic sectional view of an acoustic lens embodying the invention.

Referring to FIG. 1, a solid acoustic lens 10, made according to the invention, is illustrated comprising a first or front lens element 12 that is formed of a hard, rigid material, commonly referred to as a plastic because of its capability of being molded. The particular plastic from which lens element 12 is formed is selected in accordance with principles which will be made apparent as the specification proceeds. Suffice it to say for the moment that it is a material that is substantially acoustically clear and has an index of refraction $N'$.

Lens element 12, which may be regarded as a thin lens because its thickness $t$, is small compared to its diameter $d$, has a first surface $s_1$ having a radius of curvature $r_1$ and a second surface $s_2$ having a radius of curvature of $r_2$. As may be seen from FIG. 1 illustrating the example under discussion, surface $s_1$ is concave.

Lens 10, which is a doublet, further comprises a second or back lens element 14 that is formed of a relatively soft, resilient rubber or rubber-like material. Element 14, the material of which is desirably substantially acoustically clear, is a thin lens element having an index of refraction $N''$, a diameter equal to that of element 12, and a thickness $t_2$ between surfaces $s_3$ and $s_4$ thereof. Surface $s_3$, which is convex in this example, thas a radius of curvature $r_3$ that is equal to $r_2$, while surface $s_4$ is concave and has a radius of curvature $r_4$.

As one important feature of the lens 12 embodying the invention, a feature that lends considerable weight to its success as an acoustic lens for use in a water environment at high frequencies, the material from which lens element 14 is formed is bonded directly to the material of lens element 12, through its own molecular bonding ability. Surfaces $s_2$ and $s_3$ are, therefore, surfaces only in the sense of surface $s_2$ being a surface of element 12 with respect to the material in element 14 and in the sense of surface $s_3$ being a surface of element 14 with respect to the material of which element 12 is formed. Inasmuch as no cement is used between elements 12 and 14 as would be the case between glass lens elements in a cemented optical doublet, surfaces $s_2$ and $s_3$ may be considered as a boundary b between the respective indexes of refraction $N'$ and $N''$ of the materials of which the unitary structure of lens 10 is comprised.

This direct bonding of the materials together serves several purposes. As one purpose, the number of interfaces between different materials is reduced by two. Even when two materials are very close, perhaps in partial contact, there exist such spaces therebetween from slight differences in mating radii of curvature, surface irregularities, and the like, that there arise substantial energy losses and reflections. This is so even though the spaces are so small as to be regarded as negligible for purposes of ray tracing as in the aforementioned U.S. Pat. No. 3,618,696. The problems of losses and reflections, where any space exist, are increased materially at higher acoustic frequencies. Bonding the materials together eliminates these spaces.

Another purpose of bonding the materials together is to utilize the structural rigidity of the material of the front element 12 as a shape retaining support for the material of the back element 14. While the material of the latter is somewhat resilient, in large areas such as are encountered in acoustic lenses, the preferred material of the back element is not self-supporting.

It should be noted here that the front element, which is the one formed of the hard, rigid material is the one that has the thicker edges characteristic of a negative or reducing element, whereas the back element is the positive or magnifying element. This relationship, rather than the reverse of having the soft plastic have the thicker edges, produces a desirable and beneficial shading effect of such losses as do occur in the harder plastic. That is to say, by placing the greater losses in the peripheral portions, which are the portions that are less effective per area than the central portions in contributing to image resolution, the depreciatory effects of the losses are minimized. since the hard, rigid material of element 12 is characteristically more lossy that the soft material of element 14, it is advantageous to have the thick outer edges in the hard lens element.

Indexes of refraction of all known materials suitable for acoustic lens use vary considerably with changes in temperature, and it is common for the temperature of sea water to vary considerably from place to place or depth to depth. Accordingly, in order for a lens such as 10 to have a reasonably constant focal length under differing temperature conditions, the materials of elements 12 and 14 thereof must be selected to have thermal dispersion coefficients $v'$ and $V''$ that offset one another whereby the effective index of refraction $N_{eff}$ is substantially the same for different temperatures in a given range of temperatures. In addition, it is desirable to have an acoustic lens 10 that is corrected for spherical aberration and comatic aberration.

Consider first the derivation of formulae for computing values of radii of curvature $r_1$, $r_2$, $r_3$, and $r_4$ which will result in an athermal lens 10 embodying the foregoing described bonded combination of solid lens elements 12 and 14. In doing so, let:

$f'T_i$ represent the focal length of front lens element 12 at temperature $T_i$;

$f''T_i$ represent the focal length of back lens element 14 at temperature $T_i$;

$fT_i$ represent the focal length of the combination, lens 10, at temperature $T_i$;

$N'T_i$ represent the refractive index of front lens element 12 at $T_i$;

$N''T_i$ represent the refractive index of back lens element 14 at $T_i$; and $N_{eff}$ represent the effective refractive index of the combination, lens 10. Also, let $i = 1, 2,$ or 3 to represent the extreme low, mid range, and extreme high temperatures, respectively, to be encountered by the lens.

Define a shape factor $q$ such that $$q = r_4 + r_{1/}\, r_4 - r_1$$

(Eq. 1)

and define thermal dispersion coefficients $v'$ and $v''$ for the two refractive materials such that $$v' = N'T_2 - 1/N'T_3 - N'T_1,$$

(Eq. 2)

and $$v'' = N''T_2 - 1/N''T_3 - N''T_1.$$

(Eq. 3)

Based on well known lens theory, $$1/f'T_2 = (N'T_2-1)(1/r_1 - 1/r_2), \quad \text{(Eq. 4)}$$

and $$1/f''T_2 = (N''T_2 - 1)(1/r_3 - 1/r_4). \quad \text{(Eq. 5)}$$

Equations 4 and 5 relate the focal lengths, refractive indices, and surface curvatures for the front and back lens elements.

Also based on well known lens theory, the resultant focal length of the combination is given by $$1/fT_i = (N'T_i-1)(1/r_1 - 1/r_2) + (N''T_i - 1)(1/r_3 - 1/r_4); \; i=1,2,3, \quad \text{(Eq. 6)}$$

To simplify the analysis, define constant factors $K'$ and $K''$ such that $$K' = 1/r_1 - 1/r_2, \quad \text{(Eq. 7)}$$

and $$K'' = 1/r_3 - 1/r_4. \quad \text{(Eq. 8)}$$

To correct for changes in focal lengths, require that $$1/fT_1 = 1/fT_3. \quad \text{(Eq. 9)}$$

From Equation 6 may then be written, $$K'/K'' = -N''T_3 - N''T_1/N'T_3 - N''T_1. \quad \text{(Eq. 10)}$$

Note that from Equations 4 and 5, second relationships for $K'/K''$ may be written $$K'/K'' = f''T_2(N''T_2 - 1)/f'T_2(N'T_2 - 1). \quad \text{(Eq. 11)}$$

Equating Equations 9 and 10, and employing the definitions of $v'$ and $v''$, then $$f'T_2/f''T_2 = v''/v' \quad \text{(Eq. 12)}$$

Since well known lens design theory requires that $$1/fT_2 = 1/f'T_2 + 1/f''T_2, \quad \text{(Eq. 13)}$$

then $$1/f'T_2 = 1/fT_2 (v/v'-v''), \quad \text{(Eq. 14)}$$

and $$1/f''T_2 = 1/fT_2 (v''/v'-v'') \quad \text{(Eq. 15)}$$

At this point sufficient analysis has been provided to effect construction of an athermal lens. The steps required to minimize spherical aberrations and coma are yet to be described. However, it is believed that it would be instructive at this point to recite the steps required to complete a partial lens design based on the preceding analysis of thermal correction.

The steps required are as follows:

1. It is required that the following parameters be known - $fT_2$, $N'T_1$, $N'T_3$, $N''T_1$, $N''T_2$, $N''T_3$.
2. Compute the values $v'$, $v''$ from Equations 2 and 3.
3. Compute the values $f'T_2$, $f''T_2$ from Equations 14 and 15.
4. Compute the values of $K'$ and $K''$ from Equations 7 and 8.
5. Using computed values of $K'$ and $K''$ it is possible to compute an infinite number of combinations of $r_1$, $r_2$, and $r_3$, $r_4$ which will satisfy Equations 7 and 8. Any of these combinations will result in an athermal lens.

By choosing the proper combination of radii of curvature $r_1$, $r_2$, and $r_3$, $r_4$, it is possible to minimize spherical aberrations and coma in lens 10 wherein $r_2 = r_3$ and elements 12 and 14 are bonded as described earlier.

With this requirement, lens 10 now has two surfaces, represented by $r_1$ and $r_4$, which are interfaced with a composite acoustically refracting medium. According to basic lens theory:

$$1/fT_1 = (N_{eff} - 1)(1/r_1 - 1/r_4) \quad \text{(Eq. 16)}$$

From Equations 7 and 8, $$K' = K'' = 1/r_1 - 1/r_4. \quad \text{(Eq. 17)}$$

Introducing the shape factor $q$, Equation 17 becomes $$r_1 + 1/K'+K'' (1 - q-1/q+1) \quad \text{(Eq. 18)}$$

and $$r_4 = r_1 (q+1/q-1) \quad \text{(Eq. 19)}$$

and again, using Equation 7, $$r_2 = r_3 = r_1/1 - K'r_1. \quad \text{(Eq. 20)}$$

The above equations 18, 19, and 20 specify specific values of $r_1$, $r_2$, $r_3$, $r_4$, if the parameter $q$ is known, which will minimize aberrations. This value of $q$ can be found from the following basic formula for spherical abberations (S.A.) and coma.

$$\text{S.A.} \; \alpha \; 1/N(N-1) \cdot (N+2)/N-1) \cdot q^2 + 4(N+1)qp + (3N+2)(N-1)p^2 + N^3(N-1) \quad \text{(Eq. 21)}$$

and, $$\text{Coma} \; \alpha 3(2N+1)/4N \cdot p + 3(N+1)/4N(N-1) \quad \text{(Eq. 22)}$$

where $N = N_{eff}$, $p = 2f/s - 1$, and $s$ represents distance from lens to object.

It is now possible to recite the steps required to complete the lens design as follows:

1. Compute $N_{eff}$ from Equation 16 using the combination of radii $r_1$ and $r_4$ which were found to satisfy Equations 7 and 8.

2. Using this value of $N_{eff}$, numerically evaluate Equations 21 and 22 to determine the value of q which yields the minimum acceptable values of spherical aberration and coma.

3. Using this value of $q$, solve Equations 18, 19, and 20 for unique values of $r_1$, $r_2$, $r_3$, and $r_4$.

The foregoing analyses provides the criteria by which lenses embodying corrective principles according to the invention may be made, as will now be illustrated by example.

EXAMPLE I:

Construction of a lens 10 having $f_{Tl} = 60$ cm, where $T_1 = 0°C$, $T_2 = 15°C$, and $T_3 = 30°C$.

The material for front lens element 12 was selected to be polyphenyl oxide for which $N'T_1 = 0.6299$, $N'T_2 = 0.6655$, and $N'T_3 = .6926$.

The material for back lens element 14 was selected to be a silicone rubber formulation PRC-1933-2 obtained from Products Research and Chemical Corporation of Burbank, Calif. That silicone rubber exhibits $N''T_1 = 1.4792$, $N''T_2 = 1.6095$, $N''T_3 = 1.7284$.

Application of the steps described earlier for deriving radii of curvature that will result in thermally corrected prescriptions for $T_1$, $T_2$, and $T_3$, yields:

| $r_1$(cm) | $r_2 = r_3$(cm) | $r_4$(cm) | q |
|---|---|---|---|
| −459.9 | 31.25 | 42.724 | −0.83 |
| −434.4 | 31.375 | 42.958 | −0.82 |
| −411.5 | 31.502 | 43.196 | −0.81 |
| −390.3 | 31.629 | 43.436 | −0.80 |
| −372.3 | 31.758 | 43.678 | −0.79 |

Employing any of these combinations in Equation 35 yields $N_{eff} = 0.348$.

Figure 2:
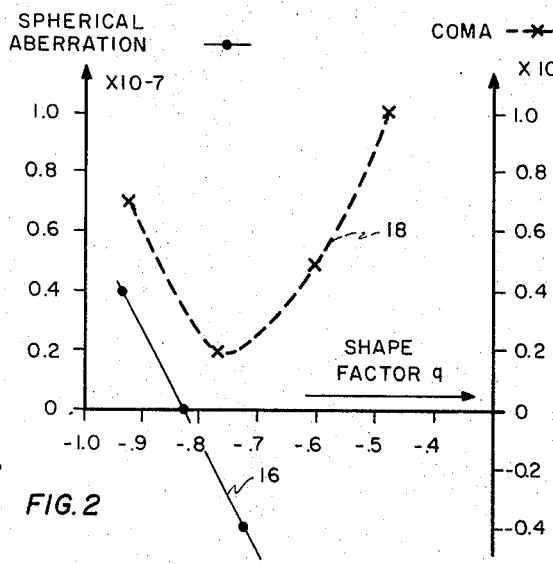
FIG. 2 is a graphical illustration of spherical and comatic aberrations.
Figure 3:
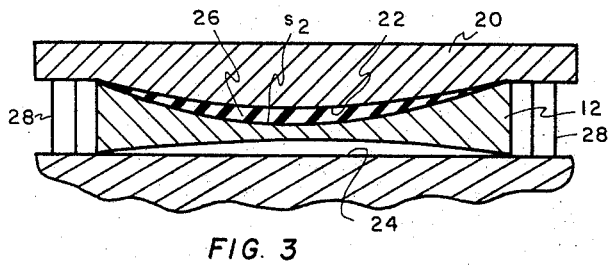
FIG. 3 is a diagrammatic sectional view illustrating a method of manufacturing the lens of FIG. 1.

The values of spherical aberration and coma for the foregoing were computed from Equations 21 and 22 as a function of shape factor, $q$, (assuming $p = -1$, or focus at infinity). The results are shown in FIG. 2 wherein the solid line 16 represents spherical aberration, while the dotted line 18 represents comatic aberration.

As may be seen from that Figure, a value of $q = -0.82$ represents a good compromise between minimum coma and spherical aberration. For this value of $q$, the lens prescription below results.

$r_1 = -434.4$ cm.
$r_2 = 31.375$ cm.
$r_3 = 31.375$ cm.
$r_4 = 42.958$ cm.

A lens 10 having the foregoing prescription was constructed by the following method.

METHOD OF MANUFACTURE

A front lens element 12 was machined from polyphenyl oxide with surfaces $s_1$ and $s_2$ having respective radii of curvature $r_1$ and $r_2$ as determined above. A die or mold 20, having a convex surface 22 complementary to the desired concave surface $s_4$ of back lens element 14 was machined.

With front lens element 12 resting on a suitable support surface 24, a quantity of uncured silicone rubber compound 26 was poured onto surface $s_2$ of element 12. Die or mold 20 was placed with convex surface 22 thereof in contact with the uncured silicone rubber, and pressed into a position determined by spacer means 28 disposed between support surface 24 and edge portions of die or mold 20 extending beyond surface 22. The silicone rubber compound was then cured with the die or mold in the illustrated position. After the silicone rubber cured to a soft resiliently flexible, solid condition, the die or mold, surface 22 of which was characterized by a suitable separating agent, was removed to reveal surface $s_4$ of lens 10.

RESULTS OF TESTS

Figure 4:
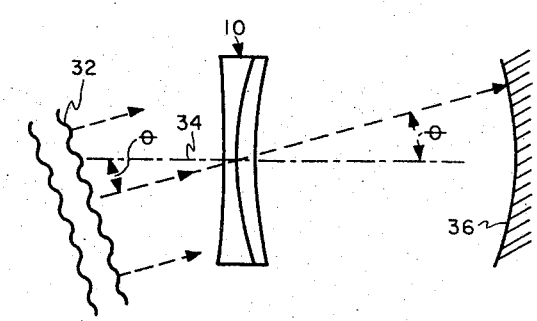
FIG. 4 is a diagrammatic illustration of off-axis wavefront focusing.
Figure 5A:
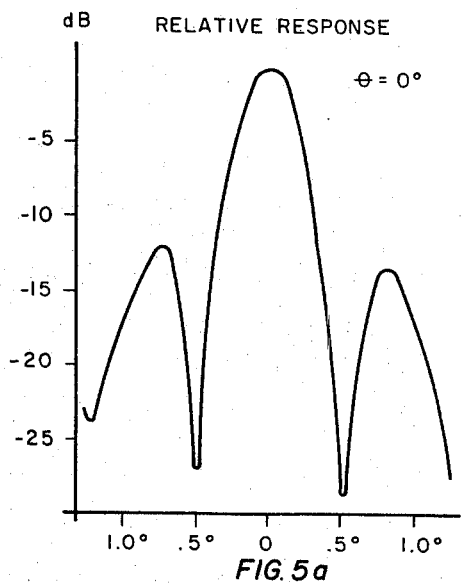
FIGS. 5a and 5b are graphic illustrations of lens relative responses.
Figure 5B:
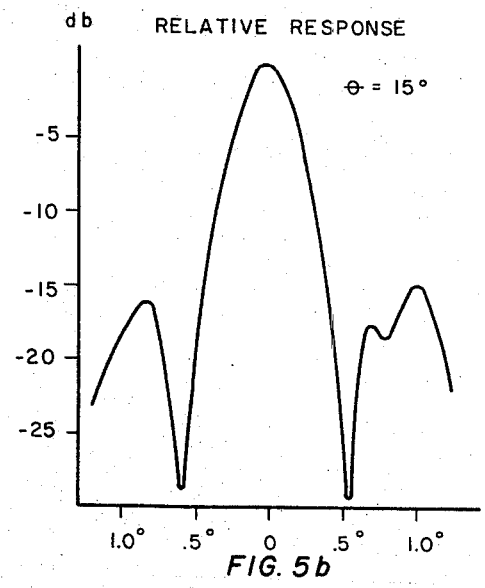

A test of the performance of any lens is the impulse response (directional response, or directivity pattern, or point source response) both on the acoustic axis and off the acoustic axis. Consider the geometry of FIG. 4, wherein a wavefront 32 approaches lens 10 at an angle $\theta$ to the principal axis 34 thereof, for refraction by the lens and impingement on a suitable focal surface 36. Measurements of the impulse response for plane waves arriving at angle $\eta$ to the acoustic axis have been made for $\theta = 0°$, $15°$. These measured responses are shown in FIGS. 5a and 5b.

The results show that for the frequency employed (600 KHz), useful directional response with an angular resolution of $0.4°$ measured at the -3 db points is obtainable over a total field of view of 30 angular degrees.

From the foregoing description of a presently preferred embodiment of the invention it will be recognized that there has been provided a solid lens that is particularly suitable for ultrasonic applications in a sea water medium. This suitability results from the fact that liquid lenses with their encapsulating shells or membranes are avoided while achieving the desirable benefits of corrections for thermal changes, spherical aberration, and coma. Additionally, the materials selected, as in the example given, are substantially inert with respect to sea water, while the lens made therefrom is relatively unaffected by substantial pressure changes at great ocean depths.

Obviously, other embodiments and modifications of the subject invention will readily come to the mind of one skilled in the art having the benefit of the teachings presented in the foregoing description and the drawings. It is, therefore, to be understood that this invention is not to be limited thereto and that said modifications and embodiments are intended to be included within the scope of the appended claims.

What is claimed is:

1. An ultrasonic lens of the character described comprising:
   a first thin lens element comprised of a substantially acoustically clear, rigid, first solid material;
   a second thin lens element comprised of a substantially acoustically clear, elastically pliant second solid material which is soft compared to said first solid material;
   said first lens element having first and second surfaces respectively characterized by first and second radii of curvature;
   said second lens element having third and fourth surfaces respectively characterized by third and fourth radii of curvature; and
   said second material of said second lens element being bonded directly to said first solid material of said first lens element, with said second and third surfaces being defined by the boundary between said solid materials.

2. An ultrasonic lens as defined in claim 1 and wherein:
one of said first and second solid materials is characterized by greater acoustic energy transmission loss than the other of said first and second solid materials; and
the one of said lens elements that is comprised of said one of said first and second solid materials is characterized by having a greater thickness of material concentrated toward the periphery thereof, whereby effects of said losses on resolution are advantageously shaded.

3. An ultrasonic lens as defined in claim 2, and wherein:
said one of said lens elements is said first thin lens element.

4. An ultrasonic lens as defined in claim 3, and wherein:
said first solid material comprises polyphenyl oxide.

5. An ultrasonic lens as defined in claim 3, and wherein:
said second solid material comprises silicone rubber.

6. An ultrasonic lens as defined in claim 4, and wherein said second solid material comprises silicone rubber.

7. A solid, two element lens for focusing of ultrasonic energy in a water medium, said lens being corrected for thermal variation, spherical aberration, and coma, and comprising:
a first lens element formed of a hard, rigid, substantially acoustically clear plastic material having a first thermal dispersion factor characteristic of change of refraction in a first direction in response to increase in temperature;
a second lens element formed of a relatively soft, elastic, substantially acoustically clear plastic material having a second thermal dispersion factor characteristic of change of refraction in a second direction, opposite to said first direction, in response to increases in temperature;
said first and second lens elements being bonded together to form said two element lens having a third dispersion factor that is characteristic of refraction being the same at a plurality of temperatures.

8. A two element lens as defined in claim 7 and wherein:
said first lens element is formed of polyphenyl oxide and, has first and second surfaces having radii of curvature $r_1$ and $r_2$, respectively;
said second lens element is formed of silicone rubber and has third and fourth surfaces having radii of curvature $r_3$ and $r_4$, respectively, $r_3$ being equal to $r_2$;
said first lens element being a negative element;
said second lens element being a positive element; and
said two element lens is positive and has a predetermined focal length.

9. A two element lens as defined in claim 8, and wherein:
said predetermined focal length $f$ and said radii of curvature $r_1$, $r_2$, and $r_4$ are respectively substantially proportional to 60 cm, −434.4 cm, 31.375 cm, and 42.958 cm.

* * * * *